United States Patent [19]
Zimmer

[11] Patent Number: 5,796,398
[45] Date of Patent: Aug. 18, 1998

[54] INFORMATION VISUALIZATION ICONS

[75] Inventor: Harry Zimmer, Thornhill, Canada

[73] Assignee: NCR Corporation, Dayton, Ohio

[21] Appl. No.: 612,991

[22] Filed: Mar. 8, 1996

[51] Int. Cl.[6] .................................................. G06F 3/00
[52] U.S. Cl. .................................................. 345/339
[58] Field of Search .................... 395/334, 348, 395/349, 356, 140, 968, 977; 345/339, 348, 349, 968

[56] References Cited

U.S. PATENT DOCUMENTS

| | | | |
|---|---|---|---|
| 5,021,976 | 6/1991 | Wexelblat | 345/356 |
| 5,276,789 | 1/1994 | Besaw et al. | 345/440 |
| 5,485,567 | 1/1996 | Banning et al. | 707/4 |
| 5,495,567 | 2/1996 | Iizawa et al. | 345/334 |
| 5,515,488 | 5/1996 | Hoppe et al. | 345/440 |
| 5,535,403 | 7/1996 | Li et al. | 345/329 |
| 5,546,526 | 8/1996 | Li et al. | 345/348 |
| 5,564,004 | 10/1996 | Grossman et al. | 345/348 |
| 5,572,650 | 11/1996 | Antis et al. | 345/356 |
| 5,581,797 | 12/1996 | Baker et al. | 345/326 |
| 5,592,600 | 1/1997 | De Pauw et al. | 345/440 |
| 5,625,767 | 4/1997 | Bartell et al. | 345/440 |

*Primary Examiner*—A. Katbab
*Attorney, Agent, or Firm*—Merchant, Gould, Smith, Edell, Welter & Schmidt

[57] ABSTRACT

A method, apparatus, and article of manufacture for displaying graphical images, e.g., icons, on a computer monitor. The images can be different shapes, sizes, and have static or dynamic images, contain sound, video images, or launch computer software applications. The images are thematically coupled to convey a larger amount of information to the observer.

18 Claims, 6 Drawing Sheets

INFORMATION VISUALIZATION ICONS

BACKGROUND OF THE INVENTION

1. Field of the Invention

The present invention generally relates to graphical user interfaces for computer systems, and in particular, to a method, apparatus, and article of manufacture for conveying large amounts of information to a computer user.

2. Description of Related Art

In today's fast paced world, recognizing and assimilating vast amounts of information quickly is key to increasing productivity and responsiveness. With the advance of technology via computers, facsimile machines, and digital data communications, the amount of data that must be processed has increased. Because of the large amounts of information that now flow between people, corporations, clients, and customers, it has become increasingly more difficult to convey information quickly. Further, the assimilation of large amounts of information depends on many variables, such as the attention span of the reader, the complexity of the information, the amount of the information, the degree of detail, and the rate at which information is presented.

Society typically uses pictures to convey information rapidly. For example, road signs convey information by shape, color and pictograms; the octagonal shape of a sign indicates "Stop," the red circle with a diagonal slash indicates not to do something, and a pictogram of an open hand indicates "Don't walk."

In the computer field, graphical pictures called "icons" are used to convey to the computer user the function of a given command: a trash receptacle indicates where to "drag" files that are to be discarded, a scissors indicates an electronic "cut" function, and a jar of paste indicates an electronic "paste" function. The icons and pictures used are usually standardized by industry, and the use of each icon or pictogram is generic to the application or use. These icons or pictograms remain static so that their meaning and interpretation remain consistent and universal.

The use of static icons in the computer field presents several problems. First, the use of static icons in the computer field take on a meaning of their own and thus static icons are unable to be modified or combined with other icons to produce a different meaning for a slightly modified icon or group of icons. Further, another problem is that the icons stand alone, as opposed to being part of a story or message containing multiple icons that would convey more information to a user in a given span of time.

SUMMARY OF THE INVENTION

To overcome the limitations in the prior art described above, and to overcome other limitations that will become apparent upon reading and understanding the present specification, the present invention discloses a method, apparatus, and article of manufacture for modifying and combining icons in a storyboard displayed on the monitor of a computer to convey additional information to a user. In the system, a graphical representation of a first icon is displayed on the monitor of the computer. Then, a graphical representation of a second icon is displayed on the monitor adjacent to at least a portion of the first icon. The spatial relationship between the first icon and the second icon, along with the properties of the icons, e.g. shape, color, and size, convey additional information to the user than the use of two separate and distinct icons. Typically, the icon comprises an outline of some shape, typically rectangular, with some pictorial or graphical representation within the outline, although other graphical representations could also be used. Moreover, more than two icons may be displayed on the monitor at the same time, conveying even more information to the computer user in a similar manner.

An object of the present invention is to convey large amounts of information to a computer user via pictorial or graphic icons displayed on a computer monitor. Another object of the present invention is to display multiple icons on a computer monitor so that the icons represent different parts of a single message. This allows the user to see the relationship between the first icon and the idea that the specific icon represents, and the ideas of the other icons that are simultaneously displayed on the monitor.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

HARDWARE ENVIRONMENT

Figure 1:
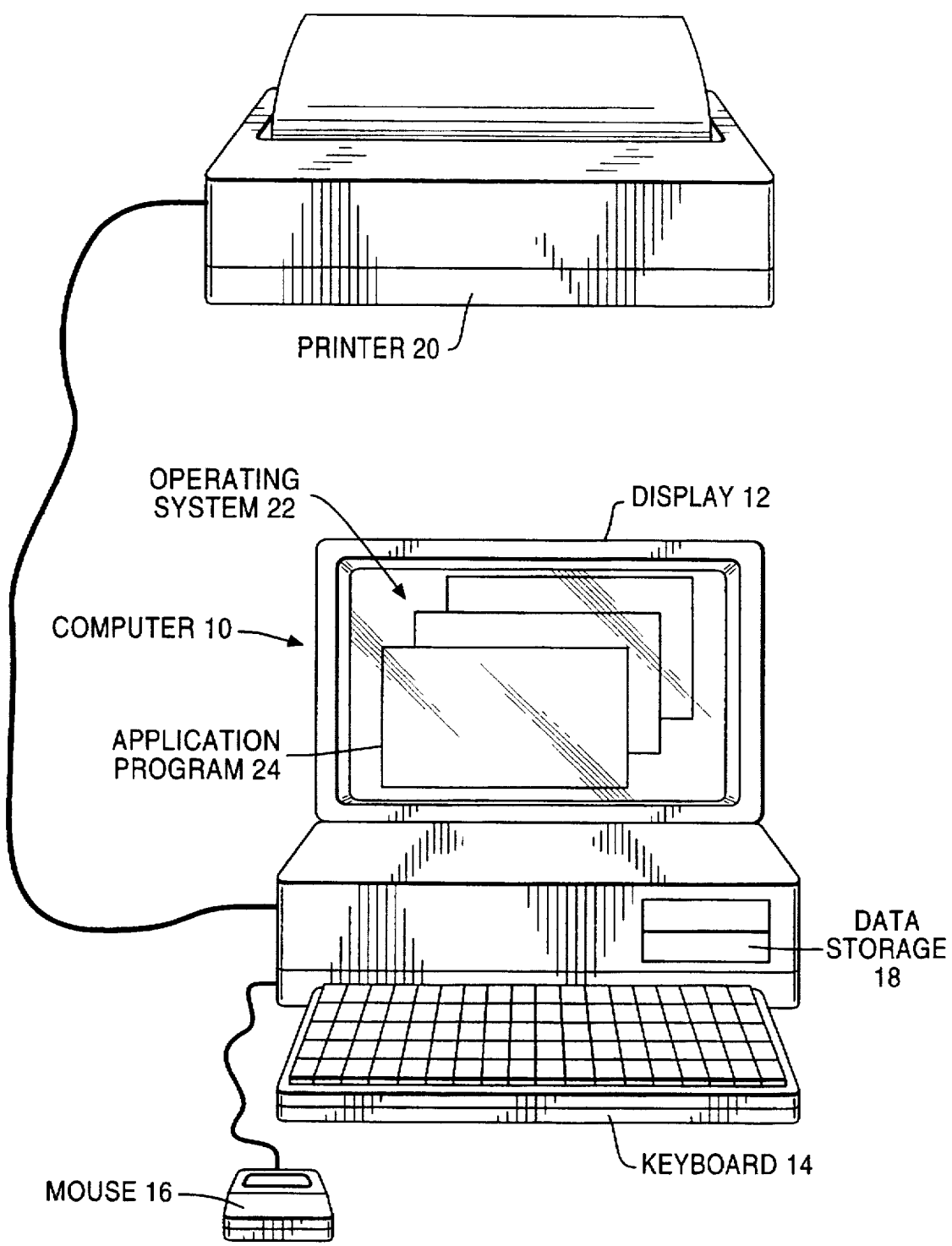
FIG. 1 illustrates one possible embodiment of the hardware comprising the present invention.

FIG. 1 is a block diagram that illustrates an exemplary hardware environment of the present invention. The present invention is typically implemented using a personal computer 10. It is envisioned that attached to the personal computer 10 may be a monitor 12, keyboard 14, mouse 16, data storage devices 18 (such as hard disk drives and/or floppy disk drives and/or CD-ROM drives), and printer 20.

The personal computer 10 operates under the control of a operating system 22, which is represented in FIG. 1 by the screen display on the monitor 12. The present invention is preferably implemented using one or more computer programs 24, which are represented in FIG. 1 by the "windows" displayed on the monitor 12, operating under the control of the operating system 22.

Generally, the computer programs 24 are tangibly embodied in a computer-readable medium, e.g. one or more of the fixed and/or removable data storage devices 18. Under control of the operating system 22, the computer programs 24 may be loaded from the data storage devices 18 into the memory of the computer 10. The computer programs 24 comprise instructions which, when read and executed by the computer 10, causes the computer 10 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
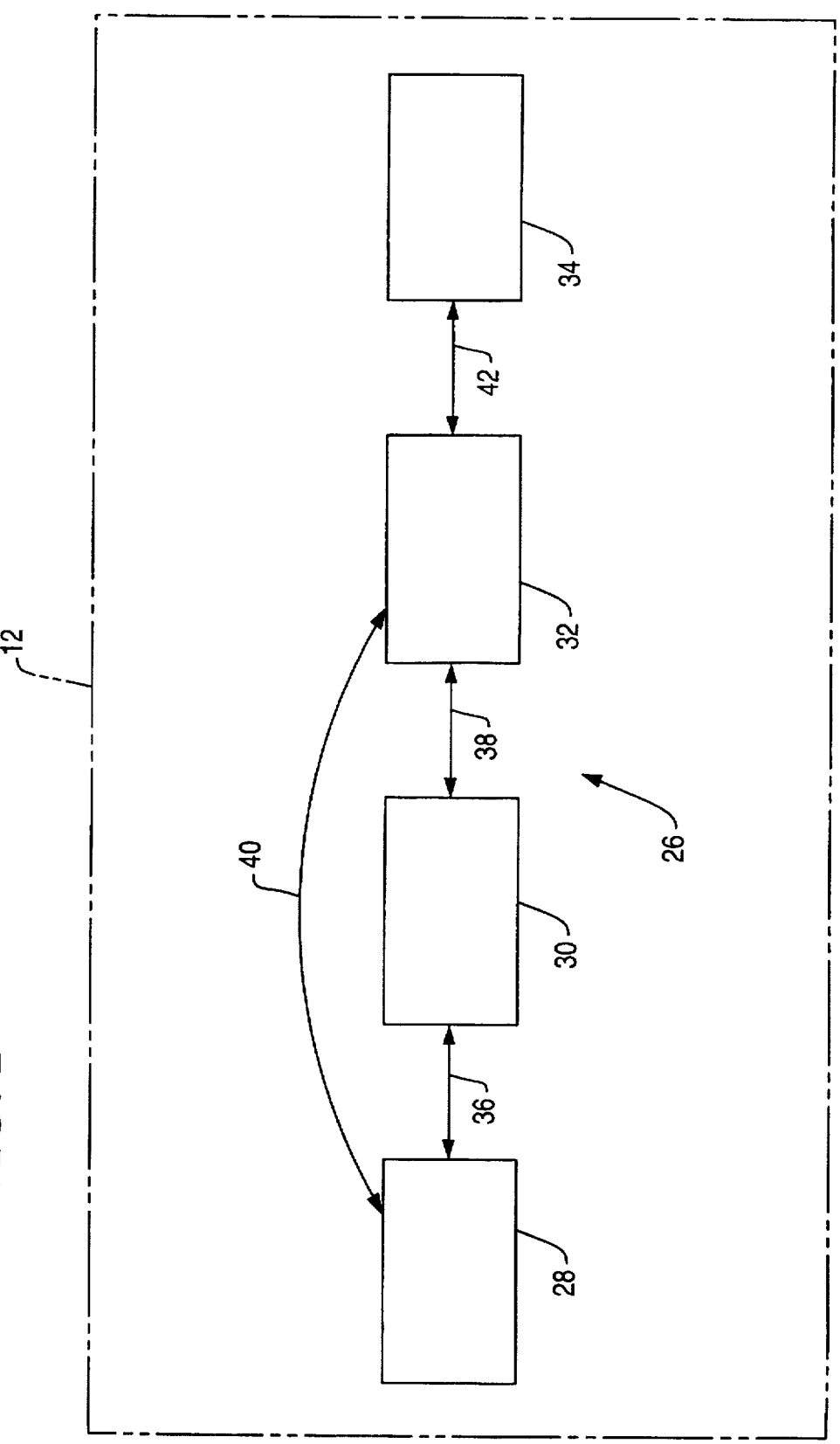
FIG. 2 illustrates a possible embodiment of the present invention.

FIG. 2 illustrates a possible embodiment of the present invention. The present invention conveys information on a computer in novel and non-obvious ways. First, the information is retrieved, either from a database maintained by the computer 10 or from an external source. The present invention then generates a "storyboard" 26 in the memory of the computer 10, wherein the storyboard comprises a plurality of icons 28, 30, 32, and 34 representative of retrieved information. Although FIG. 2 shows four icons 28, 30, 32, and 34, the monitor 12 can display as many icons as necessary to present a complete the picture of the retrieved information.

A border may be generated around each of the icons 28, 30, 32, and 34 in the memory of the computer 10. The border preferably comprises a color, a width, and/or a style representative of retrieved information. Further, the border is preferably thematically linked to a graphical content of the icon 28, 30, 32, or 34.

The present invention arranges the icons 28, 30, 32, and 34 within the storyboard so that the icons 28, 30, 32, or 34 are thematically linked by visual cues. Preferably, the visual cues are selected from a group comprising the relationship between the generated borders, the relationship between the generated icons, and the relationship between the generated borders and the generated icons. As a result, the thematic links are represented by the visual aspects of the borders and the relationship between the various borders, the visual aspects of the icons 28, 30, 32, and 34 and the relationship between the various icons 28, 30, 32, and 34, and the visual aspects of both the borders and the icons 28, 30, 32, and 34 and the relationship between the borders and the icons 28, 30, 32, and 34.

As the state of the retrieved information changes, or as the state of the computer 10 changes, the storyboard may be altered by changing the graphical content of at least one of the icons 28, 30, 32, and 34 or borders. Thus, the graphical content of an icon 28, 30, 32, and 34 or its border can be dynamic as well as static.

Similarly, new icons can be substituted for the icons 28, 30, 32, and 34 on the monitor 12 to represent a change in the retrieved information or state of the computer 10. Further, icons can be generated from scratch by the computer 10, as opposed to being selected from a pre-existing database of icons.

The spatial relationship between the icons 28, 30, 32, and 34 can also reflect the retrieved information. For example, if distance 36 is small, this may indicate that the first icon 28 is closely related to second icon 30. Similar spatial relationships can be shown via second distance 38, third distance 40, and fourth distance 42.

A preferred application for the present invention is a call center application, wherein a call center is a centralized location for receiving telephone inquiries concerning product ordering, customer service, client relations, etc.

Typically, a customer is given a toll-free number to call to report problems, complaints, request service, or supply comments to the company. When a given customer calls, information about the customer, such as name, age, occupation, and type of equipment owned, can be automatically retrieved from a database using a Caller ID™ feature (e.g. automatic number identification) or some other technique. The retrieved information is typically displayed on the monitor 12 for the call center agent to see while the agent is on the phone with the customer.

For example, the first icon 28 could be a graphical representation of the customer, e.g., a male figure, a picture of the customer, etc. The second icon 30 could be a picture of the type of equipment the person owns. The distance 36 could indicate that the customer depicted in icon 28 has already purchased the equipment pictured in second icon 30. Similar information can be graphically displayed in third icon 32 and fourth icon 34, as well. Similar spatial relationships can be shown via second distance 38, third distance 40, and fourth distance 42.

Figure 3:
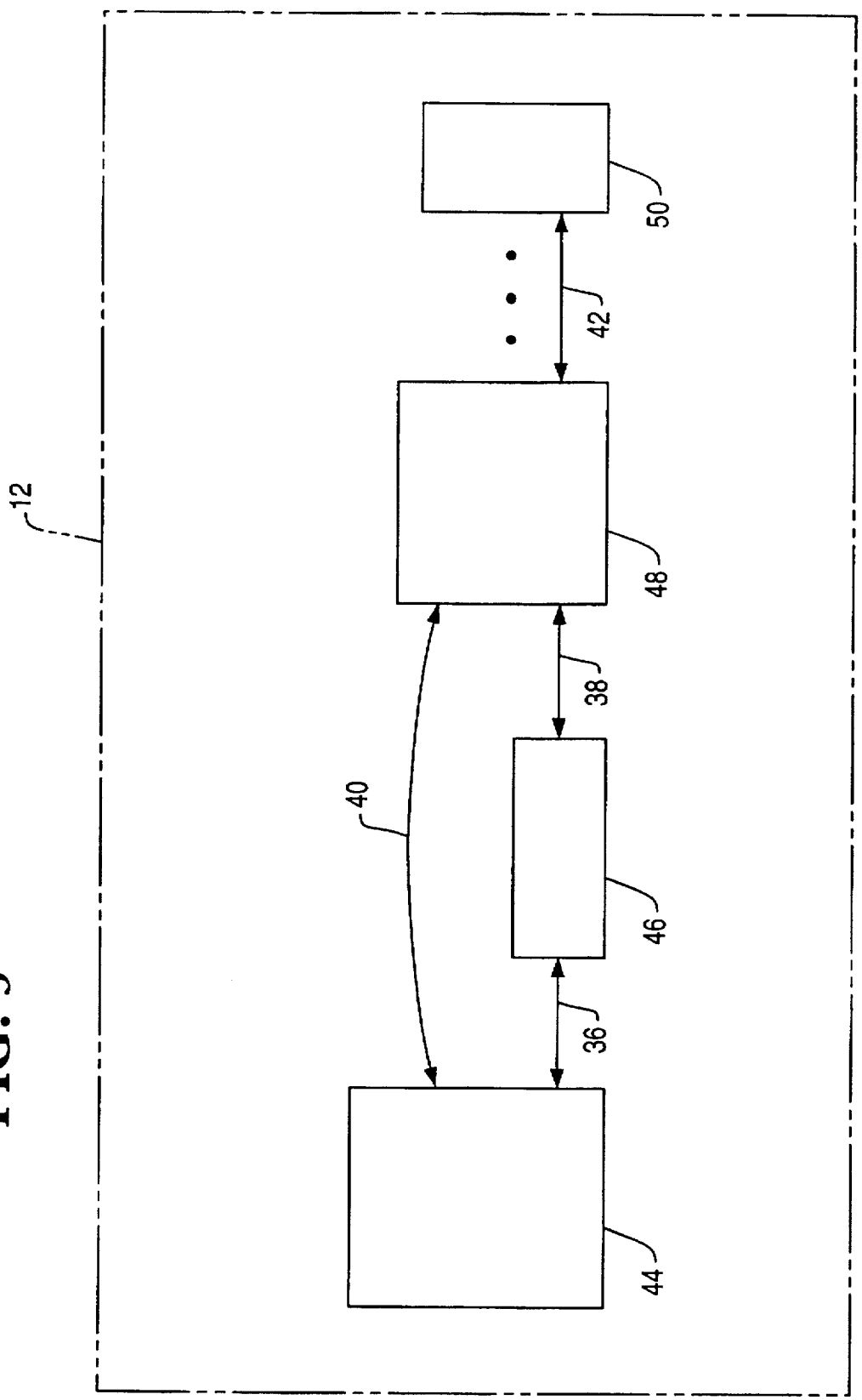
FIG. 3 illustrates a second possible embodiment of the present invention.

FIG. 3 illustrates a second possible embodiment of the present invention. The icon 44 displayed on monitor 12 is purposely created to be a given size to impart additional information to the user. For example, if the icon 44 is large, this may show that the information represented by the icon 44 is relatively important. The second icon 46 may be displayed as smaller than icon 44, which may indicate that the graphical information represented by the second icon 46 is less important than the information represented by the first icon 44. Similarly, icon 48 and icon 50 will convey additional information to the user by their relative sizes. In addition, the relative spacings 36, 38, 40, and 42 of the icons will convey other information to the user.

Figure 4:
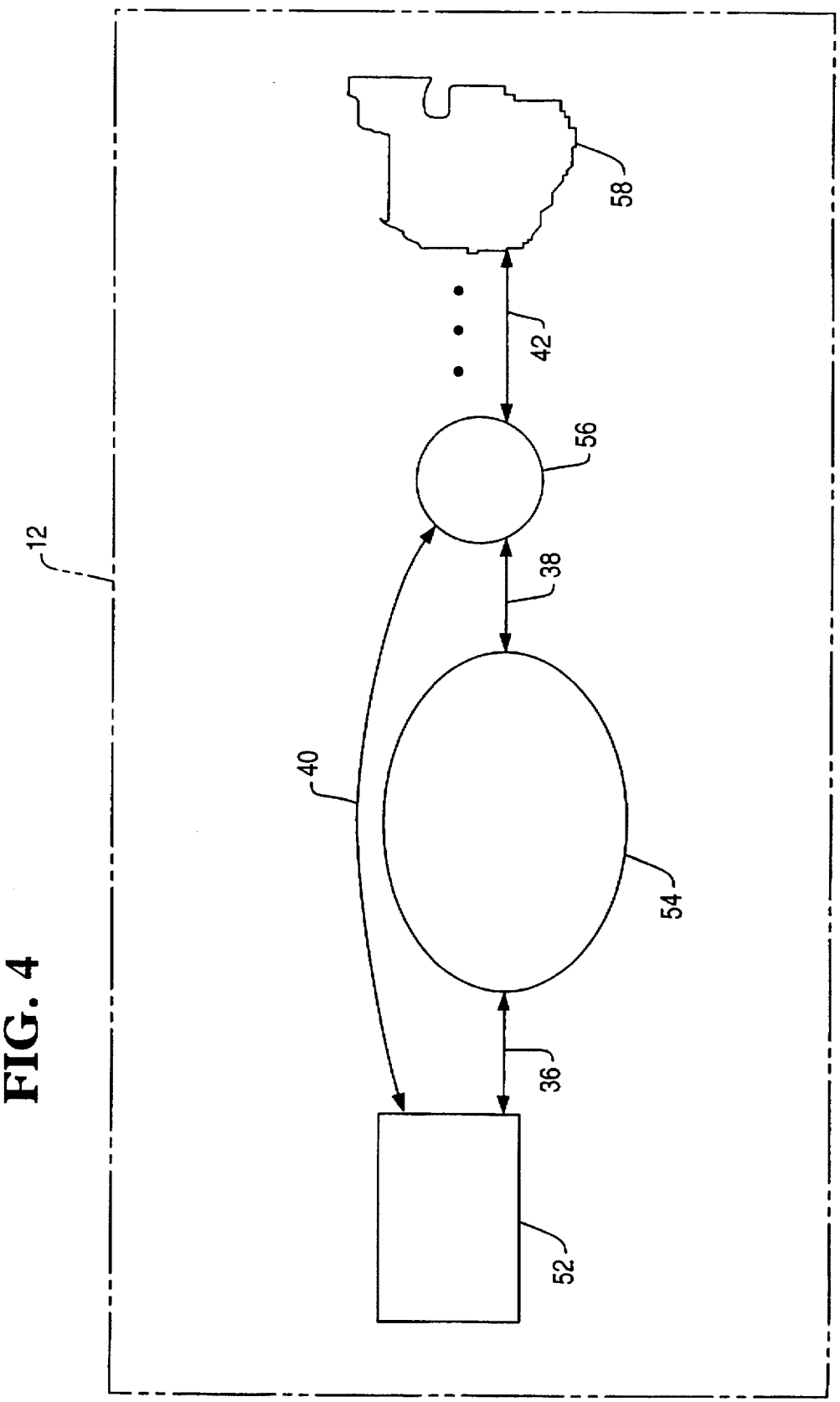
FIG. 4 illustrates a third possible embodiment of the present invention.

FIG. 4 illustrates a third possible embodiment of the present invention. By using different shapes for the icons 52, 54, 56, and 58 to be displayed, additional information is conveyed to the user. In addition, the relative spacings 36, 38, 40, and 42 of the icons will convey other information to the user.

Figure 5:
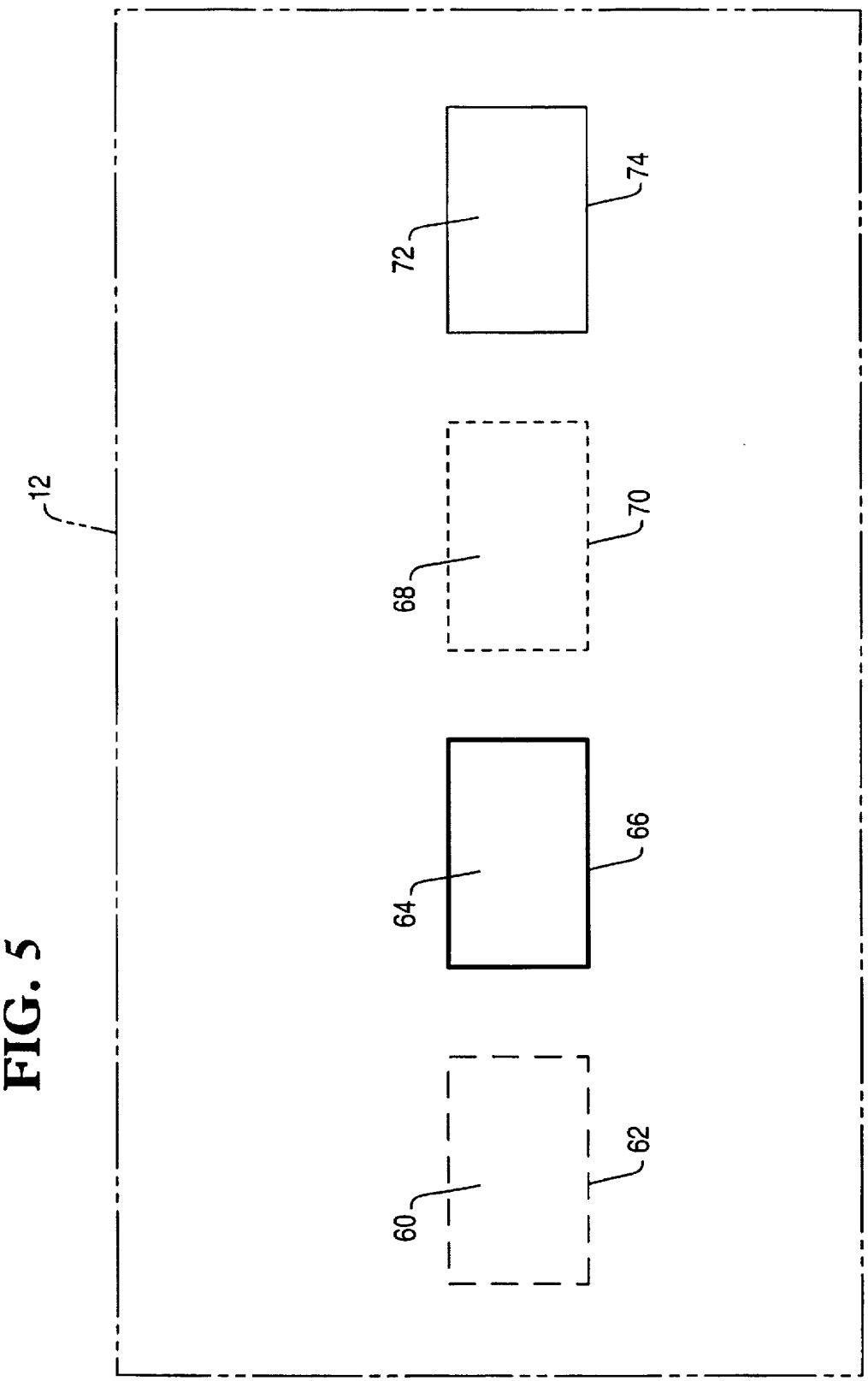
FIG. 5 illustrates a fourth possible embodiment of the present invention.

FIG. 5 illustrates a fourth possible embodiment of the present invention. By using different border styles or colors 70, 72, 74, and 76 on a given icon displayed on monitor 12, additional information is conveyed to the user.

Figure 6:
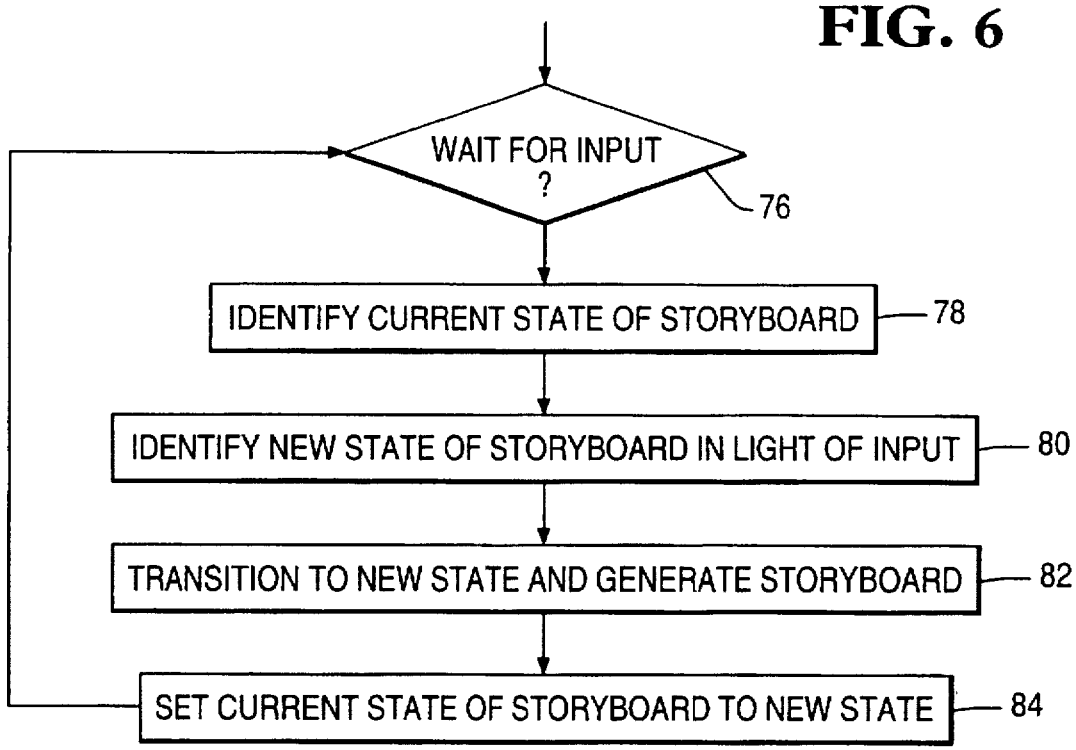
FIG. 6 is a flow chart defining the overall logic of the computer program which directs the operation of the present invention.

FIG. 6 is a flow chart defining the overall logic of the computer program embodying the present invention. Block 76 represents the computer 10 waiting for input from the keyboard 14, mouse 16, data storage device 18, or other device coupled to the computer 10. Block 78 represents the computer 10 identifying the current state of the storyboard 26. Block 80 represents the computer 10 identifying the new state of the storyboard 26 in light of the input, wherein the input has caused a change in the state of the information displayed on the monitor 12. Block 82 represents the computer 10 transitioning to the new state and generating a storyboard 26 representative of that new state. Block 84 represents the computer 10 setting the current state of the storyboard to that new state. Thereafter, control transfers back to block 76.

Within each icon, a number of graphical representations are possible. Static or dynamic icons are available to convey a meaning to the user. Further, a video image, such as a video of the inside of a home, can be used to be able to convey additional information to the user. In addition, an icon can contain a graphical representation of a speaker, which can be activated by the user to allow the computer to relay recorded sound to the user. Finally, the icon can contain a graphical representation of a computer, which, when activated by the user, could launch a computer software application.

Figure 7:
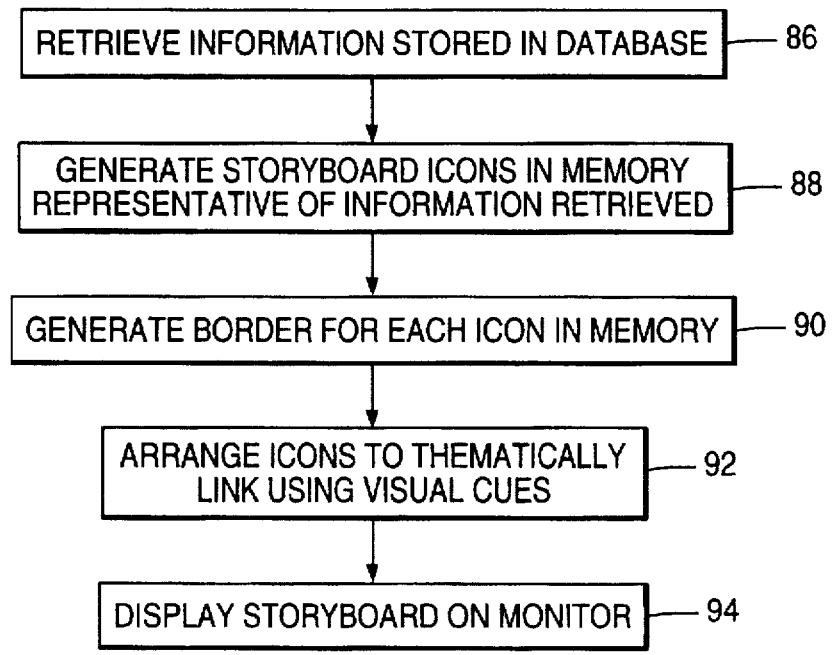
FIG. 7 is a flow chart defining the steps performed by the computer program which directs the operation of the present invention.

FIG. 7 is a flow chart defining the steps performed by the computer program which directs the operation of the present invention. Block 86 represents the computer 10 retrieving input from the data storage device 18, or other device coupled to the computer 10. Block 88 represents the computer 10 generating the storyboard icons in the memory of the computer 10 that are representative of the information retrieved. Block 90 represents the computer 10 generating a border for each of the icons in the memory, where the border is thematically linked to some graphical content of the icon. Block 92 represents the computer 10 arranging the icons within the storyboard so that the icons are thematically linked using visual cues, where the visual cues are selected from a group comprising a relationship between the generated borders, a relationship between the generated icons, and a relationship between the generated borders and the generated icons. Block 94 represents the computer 10 displaying the storyboard on the monitor 12.

In conclusion, the present invention discloses a method, apparatus, and article of manufacture for displaying graphical images, e.g., icons, on a computer monitor. The images can be different shapes, sizes, and have static or dynamic images. The images are thematically coupled to convey a larger amount of information to the observer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of conveying information on a computer having a memory and a monitor attached thereto, comprising the steps of:
   (a) retrieving information stored in a database into the memory of the computer;
   (b) generating a storyboard in the memory of the computer, wherein the storyboard comprises a plurality of icons representative of the retrieved information from the database;
   (c) generating a border around each of the icons in the memory of the computer that is thematically linked to a graphical content of the icon, wherein the border comprises a color, a width, and a style representative of information retrieved from the database;
   (d) arranging the icons within the storyboard so that an icon is thematically linked to at least one other icon and at least one border using visual cues, wherein the visual cues are selected from a group comprising a relationship between the generated borders, a second relationship between the generated icons, and a third relationship between the generated borders and the generated icons; and
   (e) displaying the storyboard on the monitor attached to the computer.

2. The method of claim 1, further comprising the step of altering the storyboard by changing the graphical content of at least one of the plurality of icons.

3. The method of claim 1, further comprising the step of altering the storyboard by changing at least one of the borders of the icons.

4. The method of claim 1, wherein the icons each have different shapes.

5. The method of claim 1, wherein the icons each have different sizes.

6. The method of claim 1, wherein the icons each have different borders.

7. An apparatus for conveying information, comprising:
   (a) a computer having a memory and a monitor attached thereto;
   (b) means, performed by the computer, for retrieving information stored in a database into the memory of the computer;
   (c) means, performed by the computer, for generating a storyboard in the memory of the computer, wherein the storyboard comprises a plurality of icons representative of the retrieved information from the database;
   (d) means, performed by the computer, for generating a border around each of the icons in the memory of the computer that is thematically linked to a graphical content of the icon, wherein the border comprises a color, a width, and a style representative of information retrieved from the database;
   (e) means, performed by the computer, for arranging the icons within the storyboard so that the icons are thematically linked using visual cues, wherein the visual cues are selected from a group comprising a relationship between the generated borders, a second relationship between the generated icons, and a third relationship between the generated borders and the generated icons; and
   (f) means, performed by the computer, for displaying the storyboard on the monitor attached to the computer.

8. The apparatus of claim 7, further comprising means for altering the storyboard by changing the graphical content of at least one of the plurality of icons.

9. The apparatus of claim 7, further comprising means for altering the storyboard by changing at least one of the borders of the icons.

10. The apparatus of claim 7, wherein the icons each have different shapes.

11. The apparatus of claim 7, wherein the icons each have different sizes.

12. The apparatus of claim 7, wherein the icons each have different borders.

13. A program storage medium readable by a computer having a memory, the medium tangibly embodying one or more programs of instructions executable by the computer to perform method steps for conveying information on a computer having a memory and a monitor attached thereto, the method comprising the steps of:
   (a) retrieving information stored in a database into the memory of the computer;
   (b) generating a storyboard in the memory of the computer, wherein the storyboard comprises a plurality of icons representative of the retrieved information from the database;
   (c) generating a border around each of the icons in the memory of the computer that is thematically linked to a graphical content of the icon, wherein the border comprises a color, a width, and a style representative of information retrieved from the database;
   (d) arranging the icons within the storyboard so that the icons are thematically linked using visual cues, wherein the visual cues are selected from a group comprising a relationship between the generated borders, a second relationship between the generated icons, and a third relationship between the generated borders and the generated icons; and (e) means, performed by the computer, for displaying the storyboard on the monitor attached to the computer.

14. The program storage medium of claim 13, further comprising the step of altering the storyboard by changing the graphical content of at least one of the plurality of icons.

15. The program storage medium of claim 13, further comprising the step of altering the storyboard by changing at least one of the borders of the icons.

16. The program storage medium of claim 13, wherein the icons each have different shapes.

17. The program storage medium of claim 13, wherein the icons each have different sizes.

18. The program storage medium of claim 13, wherein the icons each have different borders.

* * * * *